United States Patent
Goering et al.

(10) Patent No.: US 7,877,691 B2
(45) Date of Patent: Jan. 25, 2011

(54) ADAPTIVE DYNAMIC NAVIGATIONAL CONTROL FOR NAVIGATING WITHIN AN APPLICATION

(75) Inventors: Katharina Goering, Karlsruhe (DE); Markus Latzina, Wiesenbach (DE)

(73) Assignee: SAP AG, Walldorf (DE)

( * ) Notice: Subject to any disclaimer, the term of this patent is extended or adjusted under 35 U.S.C. 154(b) by 803 days.

(21) Appl. No.: 11/774,327

(22) Filed: Jul. 6, 2007

(65) Prior Publication Data

US 2008/0244451 A1 Oct. 2, 2008

Related U.S. Application Data

(60) Provisional application No. 60/909,355, filed on Mar. 30, 2007.

(51) Int. Cl.
G06F 15/00 (2006.01)
G06F 13/00 (2006.01)
(52) U.S. Cl. ..................... 715/738; 715/736
(58) Field of Classification Search ......... 715/851–855, 715/763–765, 736–738
See application file for complete search history.

(56) References Cited

U.S. PATENT DOCUMENTS

| | | | |
|---|---|---|---|
| 6,195,679 B1 | 2/2001 | Bauersfeld et al. | |
| 6,557,015 B1 | 4/2003 | Bates et al. | |
| 6,741,232 B1 | 5/2004 | Siedlikowski | |
| 6,820,111 B1 | 11/2004 | Rubin et al. | |
| 7,032,181 B1 | 4/2006 | Farcasiu | |
| 2002/0033850 A1 | 3/2002 | Bates et al. | |
| 2002/0138486 A1 | 9/2002 | Rishel | |
| 2004/0003351 A1* | 1/2004 | Sommerer et al. | 715/517 |
| 2005/0132018 A1* | 6/2005 | Milic-Frayling et al. | 709/213 |
| 2005/0132297 A1* | 6/2005 | Milic-Frayling et al. | 715/745 |

* cited by examiner

*Primary Examiner*—Cao "Kevin" Nguyen
(74) *Attorney, Agent, or Firm*—Schwegman, Lundberg & Woessner, P.A.

(57) ABSTRACT

Methods are disclosed for navigating between and within applications that display most recently visited applications and application parts, with redundancies eliminated from the display. The methods can be carried out in a computational machine that compiles a list of visited data-access locations, and identifies data-access locations that have been visited more than once, wherein each data-access location that has been visited more than once is presented in a collapsed form as a single navigational target. The methods then can present the visited data-access locations as a navigational control record including navigational targets that represent the visited data-access locations.

20 Claims, 7 Drawing Sheets

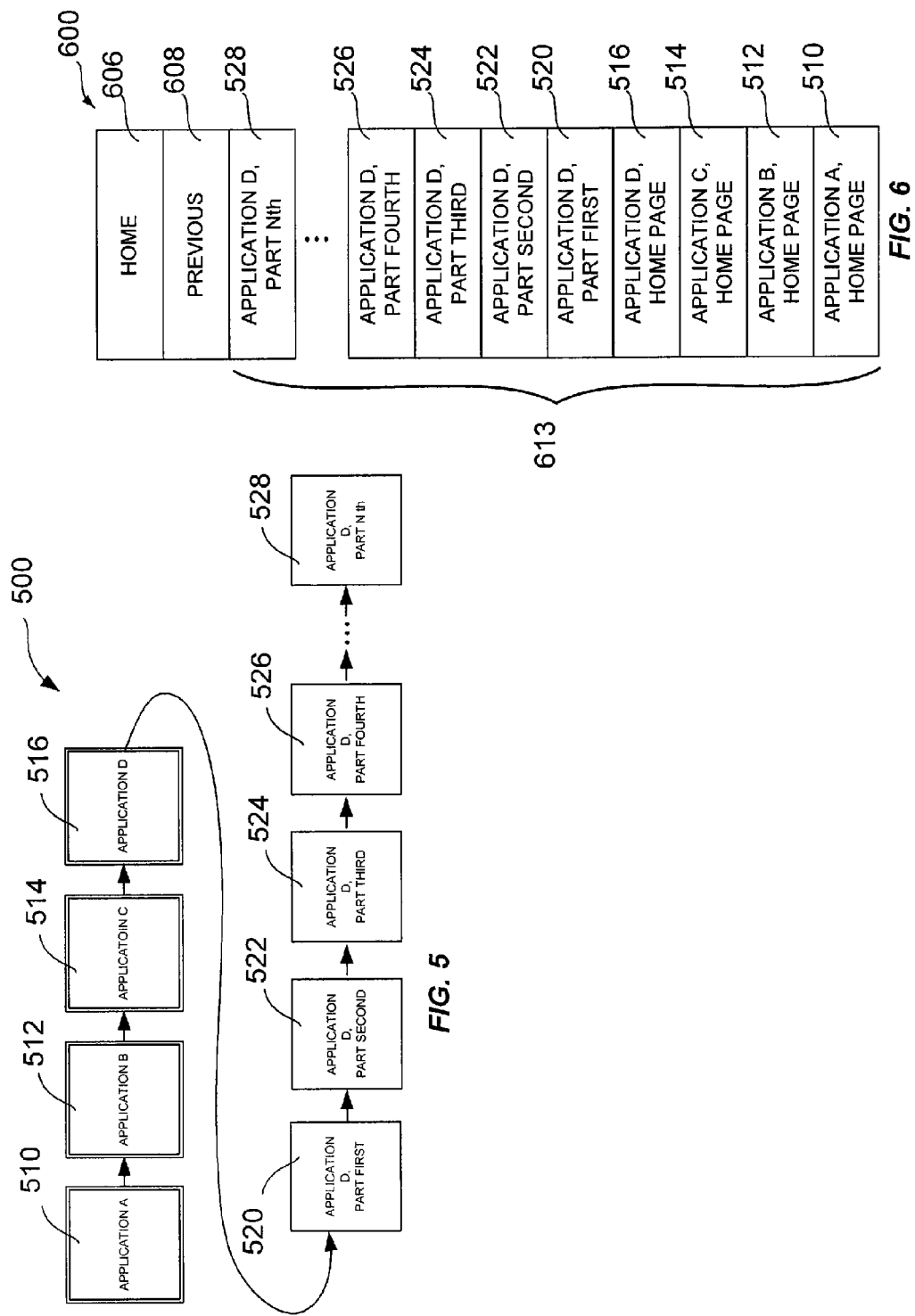

ADAPTIVE DYNAMIC NAVIGATIONAL CONTROL FOR NAVIGATING WITHIN AN APPLICATION

RELATED APPLICATION

The present patent application claims the priority benefit of the filing date of U.S. Provisional Application Ser. No. 60/909,355 filed Mar. 30, 2007, and entitled "ADAPTIVE DYNAMIC NAVIGATIONAL CONTROL FOR NAVIGATING WITHIN AN APPLICATION", the entire content of which is incorporated herein by reference.

TECHNICAL FIELD

This disclosure relates generally to dynamic navigational control during use of an application.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 2007, SAP, AG, All Rights Reserved.

BACKGROUND

Users of an application need to be provided with the ability to orient themselves at the user interface (UI) level as they navigate. Navigation includes entering applications such as websites at the home page and entering web screens within a website. Other navigation includes entering applications such as database programs at a start location and entering database pages (e.g., database records) within the database program.

During a user's session with an application, a navigation tool of choice is often a pull-down menu that is based upon a logical structure of the application. While browsing is being done, a browsing history is created. As a user history is created, each visited application part may contain various screens. Navigation through websites and web pages, however, may be linear and limited.

DESCRIPTION OF DRAWINGS

The disclosure is illustrated by way of example and not limitation in the figures of the accompanying drawings, in which like references may indicate similar elements and in which:

FIG. 5 illustrates example embodiment of a record of a navigational path at a more complex level than the navigation depicted in FIGS. 2-4.

FIG. 6 illustrates an overview of an example embodiment of a navigational control record and reflects the navigational path depicted in FIG. 5.

DETAILED DESCRIPTION

The following description contains examples and embodiments that are not limiting in scope. In the following description, for purposes of explanation, numerous specific details are set forth in order to provide a thorough understanding of an embodiment of the present disclosure. It will be evident, however, to one skilled in the art that the present disclosure may be practiced without these specific details.

Terminology

A "data-access location" may be a website that is visited during a browsing session. It may also be a single page that is visited within the website. It may also be an event or command executed at a given location within the website. A "data-access location may also be an application that has been executed, such as a database program or other type (e.g., an interactive application). It may also be an application part, such as a single event or command within the application.

Other navigation includes individual commands within an application, such as a save command, a "next page" command, a "previous page" command, a "print" command, a "send" command, and others.

Figure 1:
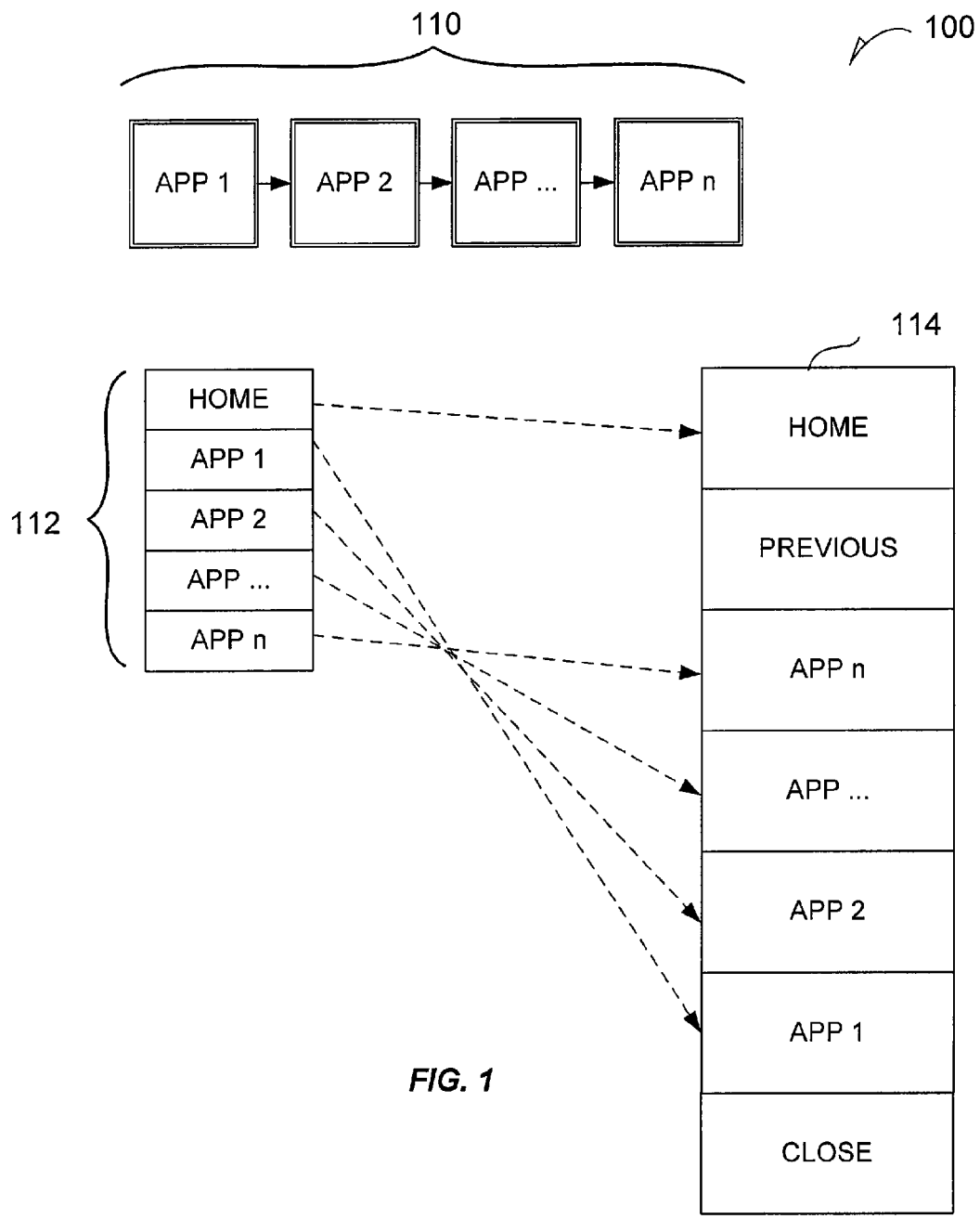
FIG. 1 illustrates a comparison 100 between a conventional navigational list and a navigational list, according to an embodiment.

FIG. 1 illustrates a comparison 100 between a conventional navigational list and a navigational list according to an embodiment. A record of a navigational path 110 is depicted with directional arrows showing the sequence of data-access locations visited. The symbol APP 1 represents a first data-access location visited, for example during a browsing session, a website www://zdf.de. The symbol APP 2 represents a second data-access location visited, for example during a browsing session, a website www://sap.germany. The symbol APP . . . represents any number of intermediate data-access locations visited, after the second data-access location was visited. And the symbol APP n represents the $n^{th}$ or most recent data-access location that was visited.

A conventional navigational list 112 is depicted with a HOME navigational target, the APP 1 navigational target presented directly adjacent the HOME navigational target, the APP 2 navigational target presented directly adjacent the APP 1 navigational target, the APP . . . navigational targets presented adjacent the APP 2 navigational target, and the APP n navigational target presented adjacent the APP . . . navigational targets.

An embodiment navigational control record 114 is depicted with a HOME navigational target presented first, and a BACK navigational target presented directly adjacent the HOME navigational target. The conventional navigational list 112 has been translated into the navigational control record 114, and the directional arrows indicate individual mappings for navigational targets.

In an embodiment, the navigational control record 114 may be depicted with at least one of the HOME and BACK navigational targets.

Further to this embodiment, the balance of the navigation control record 114 is ordered by the most recently visited data-access location, to the first-visited data access location. In other words, the most-recent-to-earliest visited data-access locations are presented as sequenced. Accordingly, the navigational target APP n represents the $n^{th}$ or most recently visited data-access location, and it is presented adjacent the BACK navigational target. In other words, the navigational target APP n is presented prominently, and in this example embodiment, it is presented prominently by being displayed adjacent the BACK navigational target.

Further, the APP . . . navigational targets are presented directly adjacent the APP n navigational target, the APP 2 navigational target is presented directly adjacent the APP . . . navigational targets, and the APP 1 navigational target is presented at the bottom of the navigation control record 114.

Thus, in FIG. 1, the conventional navigation list 112 is transformed into the navigation control record 114, according to an embodiment.

Figure 2:
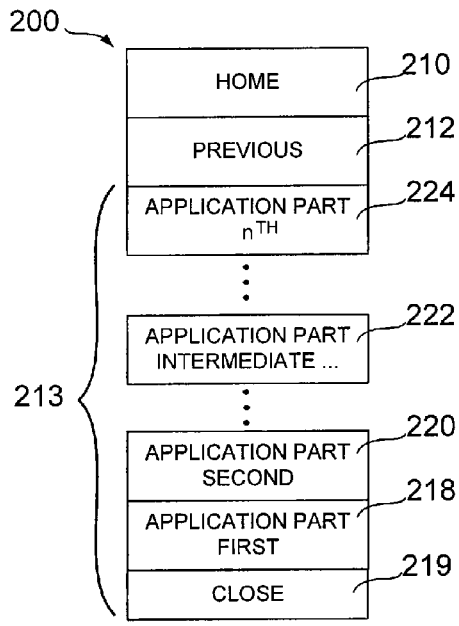
FIG. 2 illustrates an overview of a navigational control, with three areas displayed, according to an embodiment.

FIG. 2 illustrates an overview of a navigational control record 200, with three areas displayed, according to an embodiment. During the use of a single application, such as a database application, a user may move to several different parts of the application.

A HOME 210 navigational target is illustrated, according to one embodiment, at the top of the navigational control record 200 in an example form of a pull-down menu. A BACK 212 navigational target is presented adjacent the HOME 210 navigational target. Visited parts 213 of the navigational control record 200 of an application constitute a balance of the navigational control record 200 with respect to an order and presentation of the parts. The visited parts 213 is presented adjacent the BACK 212 navigational target.

Within the visited parts 213 of the navigational control record 200 navigational target, there appear various navigational targets of application parts that have been visited by the user. In one embodiment, where no application parts have been visited except the HOME 210 navigational target, only the HOME 210 and BACK 212 navigational targets are displayed. In FIG. 2, a plurality of application parts have been visited, including the last-visited APPLICATION PART $n^{th}$ 224, at least one intermediate application part represented by APPLICATION PART INTERMEDIATE . . . 222, an APPLICATION PART SECOND 220 (e.g., the second application part visited during use of the given application) and an APPLICATION PART FIRST 218.

Similar to the presentation depicted in FIG. 1, in this embodiment the visited parts 213 of the navigational control record 200 navigational target prominently presents the navigational target APPLICATION PART $n^{th}$ 224 and is presented prominently by being displayed at the top of the visited parts 213 of the navigational control record 200 navigational target.

Figure 3:
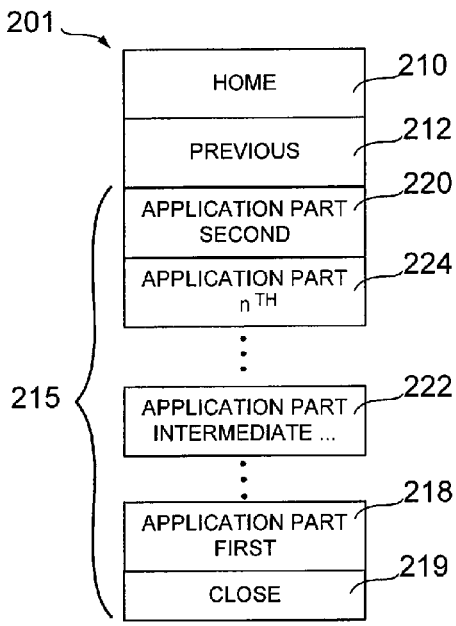
FIG. 3 illustrates an overview of a navigational control record, with three areas displayed, according to an embodiment.

FIG. 3 illustrates an overview of the navigational control record 201 depicted in FIG. 2, after a single further movement by the user. As illustrated, the visited parts 215 of the navigational control record 201 has changed. The user, previously at APPLICATION PART $n^{th}$ 224, has viewed the navigational control record 200 (as displayed in FIG. 2), and has moved back to APPLICATION PART SECOND 220. The navigational control record 201, as depicted, reflects this movement. The APPLICATION PART SECOND 220 is presented adjacent to the navigational target BACK 212, and APPLICATION PART SECOND 220 has been deleted from the former position in the list of the previous navigational control record as was seen in FIG. 2. Similar to the presentation depicted in FIG. 2, the visited parts 215 of the navigational control record 201 navigational target prominently presents the navigational target APPLICATION PART SECOND 220, and in this example embodiment, it is presented prominently by being displayed at the top of the visited parts 215 of the navigational control record 201 navigational target.

Consequently, this embodiment increases efficiency of orientation for the user, by eliminating duplicate visited application parts in the navigational control record 201. For example, the navigational target APPLICATION PART SECOND 220 is displayed only once although is has been visited more than once.

In other words, this embodiment presents a non-redundant record of data-access locations visited, which in the example embodiment illustrated in FIG. 3, represents visited application parts of a single application. In other words, application parts that have been visited more than once are each "collapsed" into a single presented navigational target in the navigational control record 202.

Figure 4:
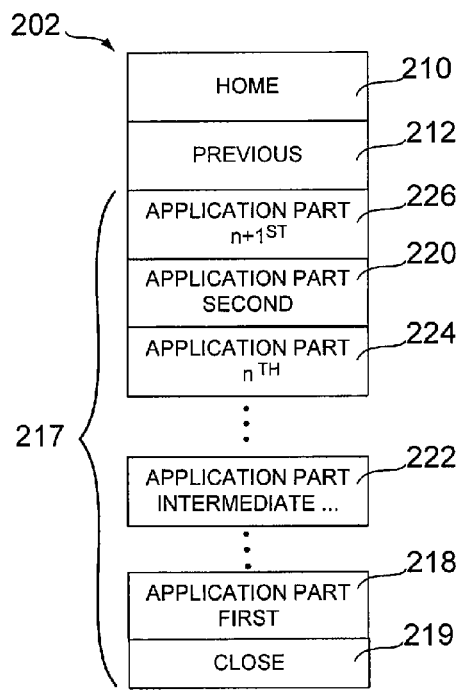
FIG. 4 illustrates an example embodiment of an overview of the navigational control record depicted in FIG. 3.

FIG. 4 illustrates an overview of the navigational control record depicted in FIG. 3, after another single movement by the user. The visited parts 217 of the navigational control record 202 navigational target has changed. The user, previously at APPLICATION PART SECOND 220, has viewed the navigational control record 201 (as displayed in FIG. 3), and has moved to an as-yet, not previously visited APPLICATION PART $n+1^{st}$ 226. The navigational control record 202, as depicted, reflects this movement. APPLICATION PART SECOND 234 is presented adjacent to the navigational target BACK 220, and APPLICATION PART SECOND 234 has moved down in the navigational control record 202, but is presented adjacent APPLICATION PART $n+1^{st}$ 226. The APPLICATION PART $n+1^{st}$ 226 is therefore presented prominently in the visited parts 217 of the navigational control record 202 navigational target.

As illustrated, this embodiment allows for newly visited application parts, but retains a non-redundant presentation of navigational targets visited, which in the example of FIG. 4, represents visited application parts of perhaps a single application. In other words, application parts that have been visited more than once are "collapsed" in the navigational control record 202.

FIG. 5 illustrates a record of a navigational path 500 at a more complex level than the navigation depicted in FIGS. 2-4. FIG. 5 illustrates applications visited, and certain application parts visited, within a given application. According to a convention set forth for this disclosure for illustrative purposes only, double-framed boxes, e.g., the data-access locations 510, 512, 514, and 516 represent visited applications. Additionally, single-framed boxes, e.g., the data-access locations 520, 522, 524, 526, and 528 represent visited application parts within the application depicted at the data-access location APPLICATION D 516. For example, the double-framed boxes may represent different distinct uniform resource locators (URLs) such as distinct websites. The double-framed boxes may also represent different distinct software programs that have been executed at a desktop environment.

The directional arrows depict the exact navigational path, beginning at APPLICATION A 510, to APPLICATION B 512, to APPLICATION C 514, and then to APPLICATION D 516. The directional arrows further depict the exact navigational path within the APPLICATION D 516, starting at APPLICATION D, PART FIRST 520, and continuing to APPLICATION D, PART SECOND 522, APPLICATION D, PART THIRD 524, and next to APPLICATION D, PART FOURTH 526. Any number of indeterminate visited application parts is next depicted with the ellipses. Finally, APPLICATION D, PART $n^{th}$ 528 represents the most recently visited data-access location.

FIG. 6 illustrates an overview of a navigational control record 600 and reflects the navigational path 500 depicted in FIG. 5. Three areas are displayed according to an embodiment of the disclosure. In various embodiments, the navigational control record 600 may be a representation of a user's navigational path among one or several applications and application parts.

A HOME 606 navigational target is illustrated at the top of the navigational control record 600, which is presented, in this embodiment, in pull-down menu form. A BACK 608 navigational target is presented adjacent the home 606 navigational target. And the visited applications and application parts 613 constitute that balance of the navigational control record 600. The visited parts 613 of the navigational control record 600 are presented adjacent the BACK 608 navigational target.

In FIG. 6, a plurality of visited applications and application parts 613 of the navigational control record 600 have been visited, including the last-visited APPLICATION D, PART $n^{th}$ 628, which is presented adjacent to the navigational target BACK 608. The ellipses may represent any number of visited application parts within APPLICATION D 616 (FIG. 5). Therefore, APPLICATION D, PART FOURTH 626 (meaning the fourth application part visited within APPLICATION D 516) is presented next. Thereafter APPLICATION D, PART THIRD 524 APPLICATION D, PART SECOND 522 APPLICATION D, PART FIRST 520, and APPLICATION D 516. The navigational control record 600 continues with the navigational targets APPLICATION C 514, APPLICATION B 512, and lastly APPLICATION A 510 at the bottom of the pull-down menu presentation.

It can be seen that, according to one example, the navigational control record 600 reflects an embodiment for providing a user-oriented record, as opposed to a hierarchical or logical record.

Figure 7:
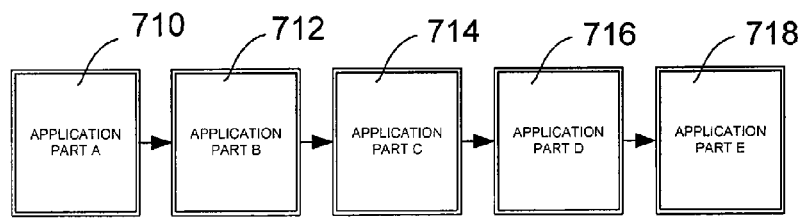
FIG. 7 is an illustration of a sequential browsing and a presentation of the sequential browsing among applications, according to an example embodiment.

FIG. 7 is an illustration of a sequential browsing and a presentation of the sequential browsing among applications according to an example embodiment. A sequence of visited data-access locations may be presented in a "pull-down" or "pull-up" menu look that includes APPLICATION A 710, followed by APPLICATION B 712, followed by APPLICATION C 714, followed by APPLICATION D 716, and lastly followed by APPLICATION E 718.

At 701 according to an embodiment, a NAVDATOR™ navigational control record 701 of the visited data-access locations is depicted graphically, as a list that includes a HOME navigational target at the beginning, with a BACK navigational target presented adjacent to HOME. Further, because the last-visited data-access location was APPLICATION D 716, the data-access location depicted in the navigational control record as APPLICATION D 716 may be visited by selecting either of the BACK navigational target or the APPLICATION D navigational target.

Figure 8:
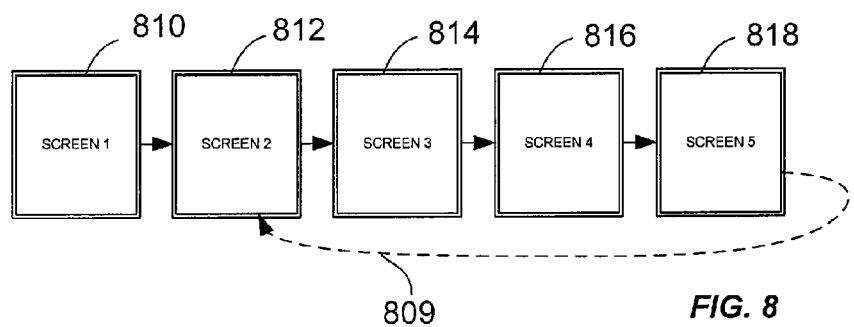
FIG. 8 is an illustration of the sequential browsing depicted in FIG. 7 after further browsing among visited data-access locations, and a presentation of the sequential browsing, according to an example embodiment.

FIG. 8 is an illustration of the sequential browsing depicted in FIG. 7 after further browsing among visited data-access locations, and a presentation of the sequential browsing, according to an example embodiment. The sequential browsing illustrates with the dashed directional arrow 809, that the APPLICATION B 712 has been re-visited immediately after leaving the APPLICATION E 718.

At 801 according to an embodiment, a NAVDATOR™ navigational control record 801 of the visited data-access locations is depicted graphically, as a list that includes the last-visited data-access location at the APPLICATION E 718. Both the BACK navigational target and the E navigational target represent immediate re-visiting capabilities to re-visit the APPLICATION E 718. As illustrated, the graphical presentation lists sequentially the navigational targets E, D, C, and finally A. This list represents the last-visited data-access locations, in sequence latest visited.

Figure 9:
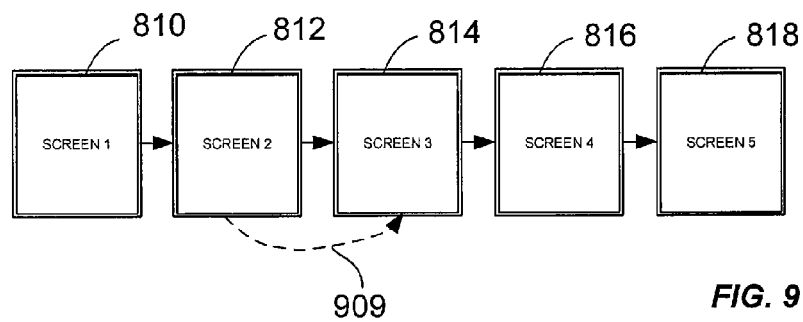
FIG. 9 is an illustration of the sequential browsing among visited data-access locations depicted in FIG. 8 after further browsing among visited data-access locations, and a presentation of the even further sequential browsing, according to an example embodiment.

FIG. 9 is an illustration of the sequential browsing among visited data-access locations depicted in FIG. 8 after even further browsing among visited data-access locations, and a presentation of the even further sequential browsing, according to an example embodiment. The sequential browsing illustrates with the dashed directional arrow 909, that the APPLICATION C 714 has been re-visited immediately after leaving the APPLICATION B 712.

At 901 according to an embodiment, a NAVDATOR™ navigational control record 901 of the visited data-access locations is depicted graphically, as a list that includes the last-visited data-access location at APPLICATION B 712. Both the BACK navigational target and the B navigational target represent immediate re-visiting capabilities to re-visit the APPLICATION B 712. As illustrated, the navigational control record 901 sequentially lists the navigational targets B, E, D, and finally A. This list represents the last-visited data-access locations, in sequence latest visited. FIG. 9 also illustrates the collapsing of details in the presentation of the navigational control record, such that data-access locations that are visited more than once are represented singly.

In one embodiment for lengthy browsing, the sequence of last-visited data-access locations is prioritized by a frequency weighting, such that the most frequently visited data-access location is presented in a prominent location such as next to the BACK navigational target. The sequence that follows the most frequently visited data-access location presentation may follow the same frequency weighting prioritization. The sequence that follows after the most frequently visited data-access location presentation may revert to the collapsed-list navigational control record embodiment set forth previously.

In another embodiment for lengthy browsing, the sequence of last-visited data-access locations is prioritized by a total-time-at-a-location weighting, such that the data-access location that has been dwelt at the longest, is presented in a prominent location such as next to the BACK navigational target. In this embodiment, the sequence that follows the most frequently visited data-access location presentation may follow the same total-time-at-a location prioritization. The sequence that follows after the most frequently visited data-access location presentation may revert to the collapsed-list navigational control record presentation embodiment set forth previously.

In yet another embodiment for lengthy browsing, the sequence of last-visited data-access locations is presented as a truncated navigational targets list. This arrangement of navigational targets is such that, for example, for a presentation of more than seven visited data-access location fields, the navigational target presentation is truncated at seven navigational targets, not including HOME and BACK, although the number seven is an arbitrary example. In other words, a navigational target list is presented of a sequence of less than all visited data-access locations. The truncated navigational control record may also include deletion of singly visited data-access locations is the total of displayed navigational targets exceeds the specified number such as seven. This arrangement of navigational targets is therefore related to all visited data-access locations, but it does not provide an exhaustive, albeit non-redundant presentation.

In one embodiment, a combination of what is displayed in FIG. 5 and FIG. 7 is displayed to present an intermediate truncation as opposed to a truncation of the earliest-visited data-access locations as they are presented as navigational targets. For example, if APPLICATION D in FIG. 5 were a website such www://amazon.com, and a user were searching for a book to purchase, but after a time at APPLICATION D, PART $n^{th}$ 528, the extensive browsing was directed immediately to APPLICATION E 718 (FIG. 7) which could be www://barnesandnoble.com, the navigational control record 600 may be truncated in the middle to collapse all the APPLICATION PART navigational targets 52, 526, 524, 522, and 520 that would belong to www://amazon.com. Accordingly, the navigational control record would take on an appearance like the navigational control record 701 depicted in FIG. 7. If the user returned to the APPLICATION D navigational target, meaning in this example, the user has returned to www://amazon.com, the navigational control record is restored to have an appearance similar to the navigational control record 600.

In an embodiment, truncation is parameterized based upon the ability of the device that is presenting the visited data-access locations, to display them as navigational targets. In one embodiment, an example is a hand-held device, such as a personal data assistant (PDA), that may result in a larger amount being truncated. In another embodiment, the device is a desktop device that may result in a smaller amount being truncated relative to the hand-held device. Further to the truncating embodiments, the truncated presentation may be restored by scrolling the navigational control record (e.g., the navigational control record 901).

It should now be clear that any combination of the three example embodiments may be combined in a navigational target presentation, depending upon a specific employment among various embodiments.

Figure 10:
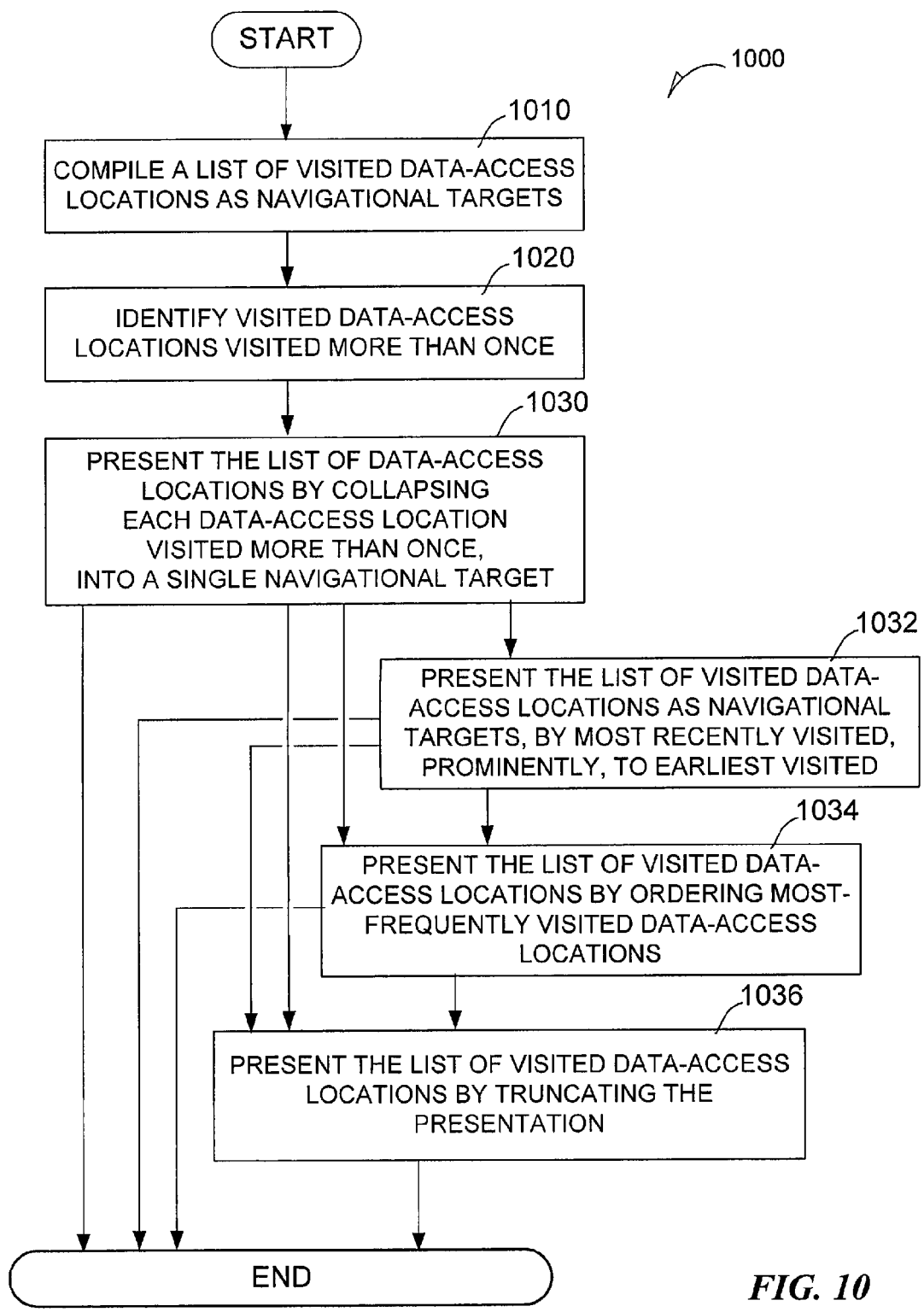
FIG. 10 is a diagram of a method for presenting a navigational control record of a browsing session, according to an example embodiment of the disclosure.

FIG. 10 is a diagram of a method 1000 including operations for presenting a navigational record of a browsing session according to an example embodiment.

At operation 1010, a list of visited data-access locations is compiled. In various embodiments, the visited data-access locations may include [[PUT IN LIST HERE, E.G., URLS, NETWORK LOCALS, FILES FROM ONE OR MORE APPS, ETC.) In one embodiment, the list is stored in a computing machine as a data string.

At operation 1020, the method includes identifying data-access locations that are visited more than once.

At operation 1030, the method includes presenting the list of visited data-access locations as navigational targets, by collapsing each presentation of data-access locations that are visited more than once into a single presented navigational target. In an embodiment where at a certain stage of the method, no data-access locations have as yet been visited more than once, the operation proceeds from operation 1020 to 1032.

At operation 1032, the method includes prioritizing the navigational target presentation of visited data-access locations according to frequency of visitation. In an embodiment, the method commences at 1010, and terminates at 1032.

At operation 1034, the method includes prioritizing the navigational target presentation of visited data-access locations according to duration of visitation. The prioritization follows the second example embodiment set forth above. In one embodiment, the method commences at 1010, terminates at 1034, and optionally includes 1032.

At operation 1036, the method includes truncation of the navigational target presentation of visited data-access locations according to a selected number such as seven navigational target presentations. In an embodiment, the method commences at 1010, terminates at 1036, and optionally includes at least one of 1032 and 1034.

Figure 11:
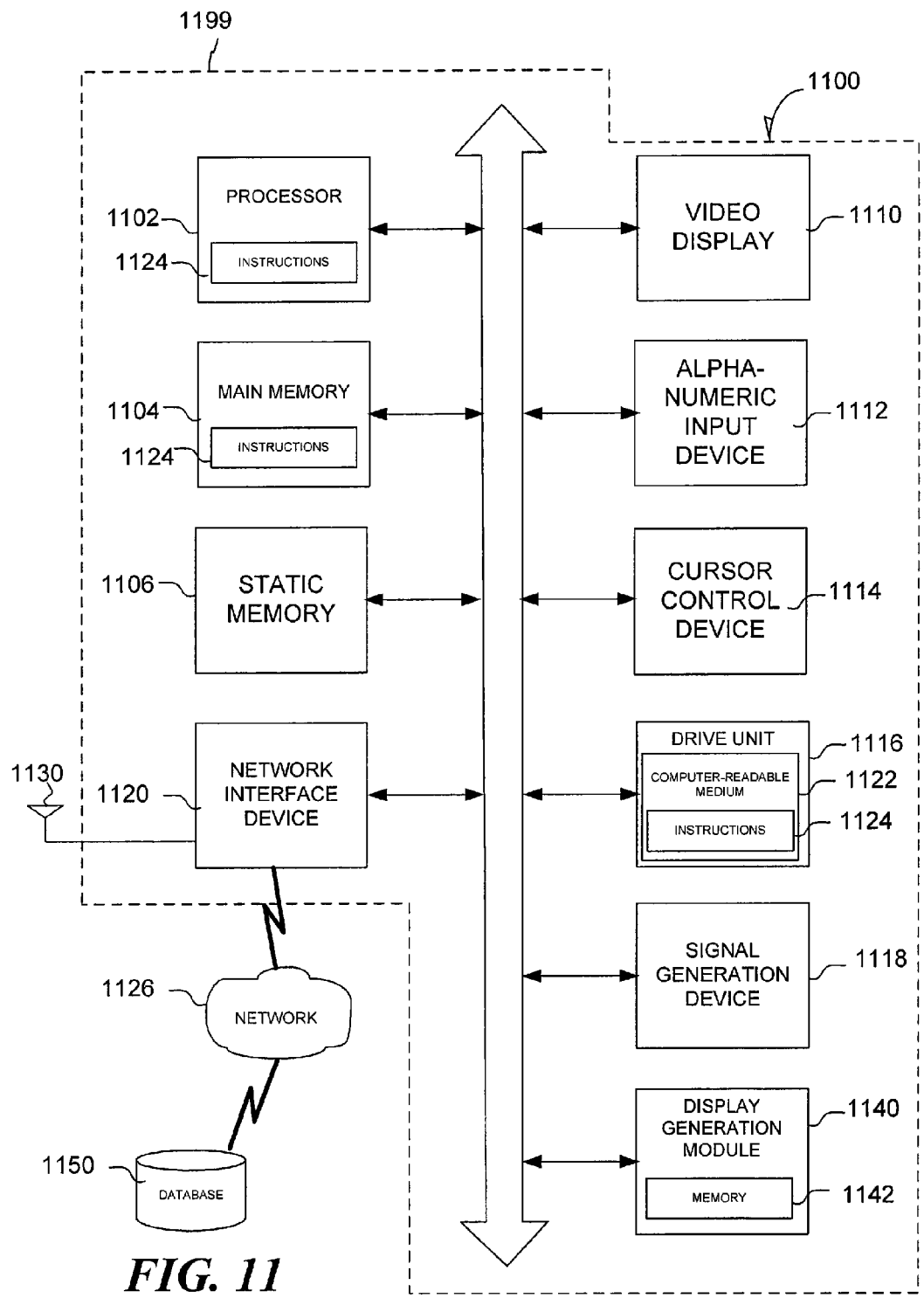
FIG. 11 is a block diagram of an example embodiment of a computational machine in the illustrative form of a computer system within which a set of instructions, for causing the machine to perform any one or more of the methodologies discussed herein, may be executed. In other words, the computational machine includes a memory having a repository with a set of instructions.

FIG. 11 is a block diagram of a computational machine 1199 in the example form of a computer system 1100 within which a set of instructions, for causing the machine 1199 to perform any one or more of the methodologies discussed herein, may be executed. For example, computer instructions include compiling a list of visited data-access locations; storing the list; identifying duplicate data access locations; and collapsing duplicate data-access locations of the specific data-access location into a single navigational target presentation.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions and data structures (e.g., software 1124) embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

The instructions 1124 may further be transmitted or received over a network 1126 via the network interface device 1120 utilizing any one of a number of well-known transfer protocols (e.g., hyper-text transfer protocol, HTTP). In various embodiments, the machine 1199 is a wireless device and includes an antenna 1130 that communicatively couples the machine 1199 to the network 1126 or other communication devices. Other devices may include other machines similar to the machine 1199, wherein the machine 1199 and the other machines operate in an ad-hoc mode of communicator with one and other.

In various embodiments, the network 1126 couples the machine 1199 to a database 1150.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to compile the list, or perform any one or more of the methodologies of the disclosed embodiments, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. The disclosed embodiments may be implemented in digital electronic circuitry, or in computer hardware, firmware, software, or in combinations of them. The disclosed embodiments may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

In various embodiments, the machine 1199 includes a display generation module 1140. In various embodiments, the display generation module 1140 is a software application. In various embodiments, the display generation module 1140 includes hardware which may include a memory storage device 1142, which may include software stored on the memory storage device. In various embodiments, display generation module 1140 is operable to generate commands to format data to be displayed on the video display 1110 according to the various methods described herein.

The embodiments may be implemented in digital electronic circuitry, or in computer hardware, firmware, software, or in combinations of them. The disclosed embodiments may be implemented as a computer program product, for example, a computer program tangibly embodied in an information carrier, for example, in a machine-readable storage device or in a propagated signal, for execution by, or to control the operation of, data processing apparatus, for example, a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method operations of any disclosed embodiments and their equivalents may be performed by one or more programmable processors executing a computer program to perform functions of the disclosed embodiments by operating on input data and generating output. Method operations may also be performed by, and apparatus of the disclosed embodiments may be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in special purpose logic circuitry.

Figure 12:
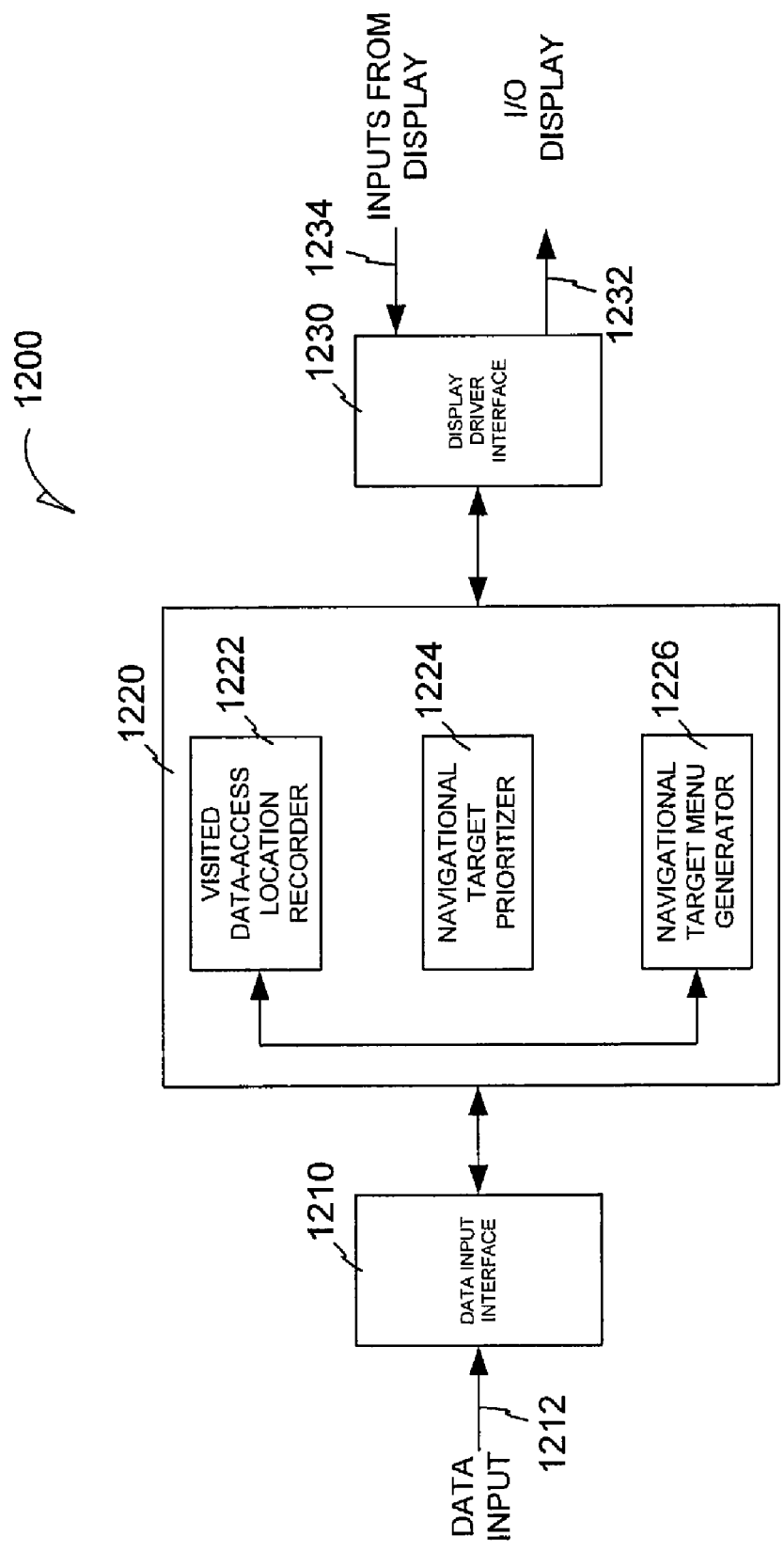
FIG. 12 is a diagram of an architecture, according to various embodiments, for presenting data-access locations that have been visited more than once in a collapsed form as a single navigational target.

FIG. 12 is a diagram of an architecture 1200 according to various embodiments. In various embodiments, the architecture 1200 includes a module 1220. The module 1220 may be software, hardware, or may be a combination of software and hardware. In various embodiments, module 1220 may include software stored as instructions, for example the instructions 1124 associated with the processor 1102 in FIG. 11. In various embodiments, the module 1220 may be the display generation module 1140 as shown in FIG. 11. In various embodiments, the module 1220 includes instructions that may be stored in more than one place within architecture 1200.

In various embodiments, the module 1220 includes one or more of the following: VISITED DATA-ACCESS LOCATION RECORDER module 1222, NAVIGATIONAL TARGET PRIORITIZER module 1224, and NAVIGATIONAL TARGET MENU GENERATOR module 1226. In various embodiments, the module 1220 is coupled to the data input interface 1210. In various embodiments, the data input interface 1210 is operable to receive input data 1212 and to provide the module 1220 with the data, such as data derived from a user's navigation through an application.

In various embodiments, module 1220 is coupled to a display driver interface 1230. In various embodiments, the display driver interface 1230 interfaces with the module 1220 to receive data provided by the module 1220 and provides an output 1232 to control a display.

Various embodiments of apparatus, methods, and system have been described herein. Various embodiments include an apparatus comprising a display to provide a visual representation of a navigational control record.

Various embodiments include a system comprising a wireless device including an antenna to communicatively couple the wireless devices to one or more other devices, and the wireless device including a display and a display generation module couple to the display, the display generation module to generate commands to cause the display to provide a view of a navigational control record.

Various embodiments include a machine-readable medium embodying instructions that, when executed by a machine, cause the machine to display a navigational control record.

The embodiments may be implemented in digital electronic circuitry, or in computer hardware, firmware, software, or in combinations of them. The embodiments may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method operations of the embodiments may be performed by one or more programmable processors executing a computer program to perform functions of the embodiments by operating on input data and generating output. Method operations may also be performed by, and apparatus of the embodiments may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory may be supplemented by, or incorporated in special purpose logic circuitry.

The embodiments may be implemented in a computing system that includes a back-end component, e.g., as a data server, or that includes a middleware component, e.g., an application server, or that includes a front-end component, e.g., a client computer having a graphical user interface or an Web browser through which a user may interact with an implementation of the embodiments, or any combination of such back-end, middleware, or front-end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Certain applications or processes are described herein as including a number of modules or mechanisms. A module or a mechanism may be a unit of distinct functionality that may provide information to, and receive information from, other modules. Accordingly, the described modules may be regarded as being communicatively coupled. Modules may also initiate communication with input or output devices, and may operate on a resource (e.g., a collection of information).

Although an embodiment have been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. Embodiments from one or more drawings may be combined with embodiments as illustrated in one or more different drawings. This Detailed Description, therefore, is not to be taken in a limiting sense, and the scope of various embodiments is defined only by the appended claims, along with the full range of equivalents to which such claims are entitled.

While the foregoing disclosure shows a number of illustrative embodiments, it will be apparent to those skilled in the art that various changes and modifications may be made herein without departing from the scope of the embodiments as defined by the appended claims. Accordingly, the disclosed embodiment are representative of the subject matter which is broadly contemplated by the embodiments, and the scope of the embodiments fully encompasses other embodiments which may become obvious to those skilled in the art, and that the scope of the embodiments is accordingly to be limited by nothing other than the appended claims.

Moreover, ordinarily skilled artisans will appreciate that any illustrative logical blocks, modules, circuits, and process operations described herein may be implemented as electronic hardware, computer software, or combinations of both.

To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments.

The previous description of the disclosed embodiments is provided to enable any person skilled in the art to make or use the embodiments. Various modifications to these embodiments will be readily apparent to those skilled in the art, and the generic principles defined herein may be applied to other embodiments without departing from the spirit or scope of the embodiments. Thus, the embodiments are not intended to be limited to the embodiments shown herein but are to be accorded the widest scope consistent with the principles and novel features disclosed herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   in a computational machine, compiling a list of visited data-access locations;
   identifying data-access locations that are visited more than once, each data-access location that has been visited more than once being presented in a collapsed form as a single navigational target; and
   presenting the visited data-access locations as a navigational control record including navigational targets that represent the visited data-access locations, the navigational control record being truncated to present a sequence of less than all visited data-access locations, the presenting of the navigational control record including one of:
      presenting the most recently visited data-access location as a prominent navigational target, and
      presenting the most frequently visited data-access location as a prominent navigational target.

2. The method of claim 1, wherein presenting the navigational control record is done by presenting the visited data-access location with the longest visiting time-at-a-location as a prominent navigational target.

3. The method of claim 1, wherein presenting navigational control record of visited data-access locations as navigational targets is done by presenting the most recently visited data-access location adjacent a BACK navigational target, which is also adjacent a HOME navigational target.

4. The method of claim 1, further including presenting all visited data-access locations wherein presenting includes presenting a navigational control record, the navigational control record including:
   a HOME navigational target;
   a BACK navigational target; and
   a presentation of navigational targets that represent visited data-access locations, wherein the presentation of navigational targets is sequenced by most-recent-to-earliest visited data-access locations.

5. The method of claim 1, wherein presenting includes presenting a visual navigation menu, the visual navigation menu including:
   a HOME navigational target; and
   a BACK navigational target.

6. The method of claim 5 further including presenting a scrolling display of the navigational targets to present at least one of the truncated navigational targets.

7. The method of claim 5, wherein the navigational control record is truncated in the middle thereof.

8. A method comprising:
   in a computational machine, compiling a list of visited data-access locations;
   identifying data-access locations that are visited more than once;
   presenting the visited data-access locations as a navigational control record including navigational targets that represent the visited data-access locations, the presenting of the navigational control record comprising presenting a most recently visited data-access location as a prominent navigational target, the navigational control record being truncated to present a sequence of less than all visited data-access locations, the presenting of the navigational control record including one of:
      presenting the most recently visited data-access location as a prominent navigational target, and
      presenting the most frequently visited data-access location as a prominent navigational target.

9. The method of claim 8, wherein the prominent navigational target is presented adjacent a BACK navigational target, and wherein the BACK navigational target is presented adjacent a HOME navigational target.

10. The method of claim 8, wherein presenting the navigational control record is done by presenting the visited data-access location with the longest visiting time-at-a location as a prominent navigational target.

11. The method of claim 8, wherein presenting the navigational control record is done by presenting the most recently visited data-access location as a prominent navigational target, and wherein presenting the navigational control record includes truncating the navigational control record of presented navigational targets.

12. The method of claim 11 further including presenting a scrolling display of the navigational targets to present at least one of the truncated navigational targets.

13. The method of claim 11, wherein the navigational control record is truncated in the middle thereof.

14. A machine-readable medium embodying instructions that, when executed by a machine, cause the machine to:
   compile a list of visited data-access locations;
   identify data-access locations that are visited more than once;
   present the visited data-access locations as a navigational control record including navigational targets that represent the visited data-access locations, wherein each data-access location that has been visited more than once is presented in a collapsed form as a single navigational target, or wherein presenting the navigational control record comprises presenting a most recently visited data-access location as a prominent navigational target, the navigational control record being truncated to present a sequence of less than all visited data-access locations, the presenting of the navigational control record including one of:
      presenting the most recently visited data-access location as a prominent navigational target; and
      presenting the most frequently visited data-access location as a prominent navigational target.

15. The machine readable medium of claim 14, wherein the instructions, when executed by a machine, further cause the machine to:
   present a HOME navigational target;
   present a BACK navigational target; and
   present the navigational control record with the most recently visited data-access location presented adjacent the BACK navigational target.

16. The machine readable medium of claim 14, wherein the instructions, when executed by a machine, further cause the machine to present a scrolling display of the navigational targets.

17. The machine readable medium of claim 14, wherein the instructions, when executed by a machine, further cause the machine to present scrolling display of at least one of the truncated navigational targets.

18. The machine readable medium of claim 14, wherein the instructions, when executed by a machine, further cause the machine to truncate navigational control record in the middle thereof.

19. A computing system comprising:
   memory having a repository with a set of instructions that, when executed, cause the computing system machine to:
   compile a list of visited data-access locations;
   identify data-access locations that are visited more than once;
   for a specific data-access location, collapse data-access locations that are visited more than once in the list for the specific data-access location into, a single data-access location; and
   present the visited data-access locations as a navigational control record including navigational targets that represent the visited data-access locations, the navigational control record being truncated to present a sequence of less than all visited data-access locations, the presenting of the navigational control record including one of:
      presenting the most recently visited data-access location as a prominent navigational target, and
      presenting the most frequently visited data-access location as a prominent navigational target.

20. The computing system of claim 19, further including a video display for presenting the list of visited data-access locations.

* * * * *